United States Patent [19]

Akiyama et al.

[11] Patent Number: 4,677,512
[45] Date of Patent: Jun. 30, 1987

[54] MAGNETIC REPRODUCING APPARATUS

[75] Inventors: Junichi Akiyama; Shu Chiba; Norikazu Sawazaki, all of Yokohama; Shigeru Yatabe, Tokyo, all of Japan

[73] Assignee: Kabushiki Kaisha Toshiba, Kawasaki, Japan

[21] Appl. No.: 883,028

[22] Filed: Jul. 10, 1986

Related U.S. Application Data

[62] Division of Ser. No. 633,915, Jul. 24, 1984, abandoned.

[30] Foreign Application Priority Data

Jul. 27, 1983 [JP] Japan ................. 58-136969

[51] Int. Cl.⁴ ............................ G11B 5/127
[52] U.S. Cl. ................... 360/110; 360/123; 360/134
[58] Field of Search ............ 360/110, 111, 123, 134, 360/125, 126

[56] References Cited

U.S. PATENT DOCUMENTS

| | | | |
|---|---|---|---|
| 2,926,844 | 3/1960 | Devol | 360/111 |
| 4,120,011 | 10/1978 | Kolb | 360/111 |
| 4,182,987 | 1/1980 | Moeller | 324/249 |
| 4,464,691 | 8/1984 | Sawazaki et al. | 360/111 |
| 4,530,016 | 7/1985 | Sawazaki | 360/134 |
| 4,575,777 | 3/1986 | Hosokawa | 360/110 |

FOREIGN PATENT DOCUMENTS

| | | |
|---|---|---|
| 57-36407 | 2/1982 | Japan . |
| 57-179932 | 11/1982 | Japan ............ 360/110 |
| 58-125219 | 7/1983 | Japan ............ 360/123 |
| 58-125220 | 7/1983 | Japan ............ 360/123 |

Primary Examiner—John H. Wolff
Assistant Examiner—Matthew J. Bussan
Attorney, Agent, or Firm—Oblon, Fisher, Spivak, McClelland & Maier

[57] ABSTRACT

An apparatus for reproducing a signal recorded, in the form of a perpendicular signal magnetization, on a perpendicular magnetic recording layer backed with a high permeability layer of a magnetic recording medium. A thin-film magnetic material is disposed to face the recording layer so that an enlarged magnetized region is formed in the high permeability layer, which includes the position at which the magnetic material faces the recording layer. In this region, magnetic variation occurs in response to the signal magnetization of the recording layer at the position the magnetic material faces the recording layer. A detecting member such as a coil is disposed in the proximity of the magnetic material so as to be magnetically coupled to the enlarged magnetized region of the high permeability layer. The detecting member is used as a tuning element of a tuning circuit supplied with high frequency energy. A resonance output voltage of the high frequency circuit varies in response to the detection of magnetic variation in the high permeability layer. A reproducing circuit detects the variation in the resonance output voltage of the high frequency circuit to reproduce the signal recorded on the recording layer.

6 Claims, 14 Drawing Figures

MAGNETIC REPRODUCING APPARATUS

This application is a division of application Ser. No. 633,915, filed on July 24, 1984 now abandoned.

BACKGROUND OF THE INVENTION

The present invention relates to a magnetic recording/reproducing apparatus for a perpendicular magnetic recording medium and, more particularly, to a magnetic reproducing system.

With a conventional recording/reproducing system adapted for an in-plane oriented magnetic recording medium a ring-shaped magnetic head is used for recording and reproduction. To record a signal on the medium, a current is applied to the winding of the head so that a magnetic field generated across the head gap magnetizes the recording medium. To reproduce the signal from the recording medium, an electromotive force induced in the head in response to the signal magnetization on the medium is taken out as a reproduced signal. This system has a problem in that as the recording wavelength becomes shorter, the demagnetizing field effect increases. The system also has the defect that in reproducing, since the ring-shaped head is a magnetic flux detection type, the magnitude of the reproduced output signal depends upon the width of the track. Thus, the conventional system has a limitation on a high density recording and reproducing.

With a recently developed perpendicular magnetic recording/reproducing system a signal is recorded in a direction perpendicular to the plane of the recording medium. This system is not adversely affected by a demagnetizing field, and is essentially suitable for high density recording because the shorter a signal becomes in wavelength, the better recording is attained. However, with this conventional system reproduction is effected by detection of magnetic flux so that the magnitude of a reproduced output depends upon the width of a track. Therefore, taking into account the S/N ratio and reproducing sensitivity, the high-density recording cannot be effectively used.

A system for reproducing a signal by detecting a signal magnetic field from a magnetic recording medium is disclosed in Japanese Patent Early Publication No. 57-36407. This system uses as a magnetic head a magnetic material with an inductance element coupled thereto, the magnetic head being used as a constituent of a tuning circuit. In this system, a variation in magnetic field from the recording medium causes the permeability ($\mu$) of the magnetic material of the head to vary, resulting in the shift of a tuning frequency of the tuning circuit, or the quality factor (Q) of the tuning circuit to vary. The variation in the tuning frequency and/or Q of the tuning circuit is used to take out the variation of the resonance output voltage of the tuning circuit. With this system, a slight variation in magnetic field from the recording medium results in a great variation in voltage. According to the reproducing system, therefore a reproduced output having high S/N ratio can be obtained even if the width of the recording track is narrow, thereby allowing high-density recording and reproducing.

A magnetic material having a high permeability causes in general a ferromagnetic resonance absorption phenomenon in a high frequency region. The permeability and loss of the magnetic material remarkably alter in the high frequency region even if the external magnetic field only slightly changes. Therefore, the above-mentioned reproducing system arranged to detect the signal magnetic field through the magnetic material is essentially suited for the high density recording/reproducing with narrow tracks because the reproduced output level depends only upon the intensity of the signal magnetic field rather than depending upon the magnetic flux. It is accordingly considered that an extremely high-density recording/reproducing system will be realized by combining this reproducing system with the perpendicular magnetic recording system.

However, this reproducing system has a problem in respect of the recording wavelength characteristics. This is due to the relationship between the distribution of the signal magnetic fields on the magnetic recording medium and the shape of the magnetic material. More specifically, the signal magnetic field on the magnetic recording medium becomes stronger as the wavelength recording is shorter, concentrating in the vicinity of the recording surface. The signal magnetic field becomes weak as the wavelength becomes long, spreading from the recording surface. Consequently, since the intensity and distribution of the magnetic field acting on the magnetic material are not uniform over the entire wavelength range, it is difficult to obtain a flat reproducing frequency response over a wide frequency range. The reproducing system is not practically suited for reproduction of video signals or audio signals.

SUMMARY OF THE INVENTION

An object of the present invention is to provide a magnetic recording/reproducing apparatus which is arranged to reproduce signals recorded on a perpendicular magnetic recording medium in a narrow track at a high S/N ratio and has a good frequency response over a wide frequency range.

A perpendicular magnetic recording medium for which a recording/reproducing apparatus of this invention is adapted comprises a perpendicular magnetic recording layer backed with a high-permeability layer. To reproduce a signal recorded on the recording layer in the form of perpendicular signal magnetization, a thin-film magnetic material is arranged to have its one end faced the recording layer of the recording medium. As a result, in an extended area of the high-permeability layer including the position at which the magnetic material faces the recording layer, a magnetic variation occurs corresponding to the signal magnetization of the recording layer at the position at which the magnetic material faces the recording layer.

According to this invention, a detecting member such as a coil is disposed in the proximity of the thin-film magnetic material so as to be magnetically coupled with the extended magnetized area of the high-permeability layer. The detecting member is used as a tuning element of a tuning circuit to which a high-frequency energy is applied. When the magnetic variation in the high-permeability layer is detected by the detecting member a resonance output voltage of the tuning circuit is changed, which is detected by a reproducing circuit to reproduce the recorded signal.

According to the present invention, short-wavelength signals recorded on a narrow track of the perpendicular magnetic recording medium at an extremely high density can be successfully reproduced.

More particularly, most of the magnetic flux, generated from a signal magnetization recorded on the recording layer of the recording medium pass through a magnetic circuit extending from the signal magnetization through the thin-film magnetic material and the high-permeability layer to the signal magnetization. Therefore, the signal magnetization recorded in a very small region forms an extended magnetization in the high-permeability layer. When a signal recorded on a recording medium with no high permeability layer is detected by a thin film magnetic material, the signal magnetic field is abruptly attenuated as it departs from the surface of the recording medium. This becomes more prominent as the signal wavelength becomes shorter. Thus, reproduction of a signal having a short wavelength becomes difficult.

On the other hand, according to the present invention, the magnetic field formed in the high permeability layer due to the signal magnetization is distributed in an extended area irrespective of the wavelength. In addition, the magnetic field does not have a large gradient except in the vicinity of the signal magnetization at a position corresponding to the thin film magnetic material. Thus, the effective region of the magnetic field in the reproduction of the signal is extremely wide. This is very advantageous in the reproduction of short-wavelength signals. A flat frequency response can also be expected.

DETAILED DESCRIPTION OF THE PREFERRED EMBODIMENTS

Figure 1:
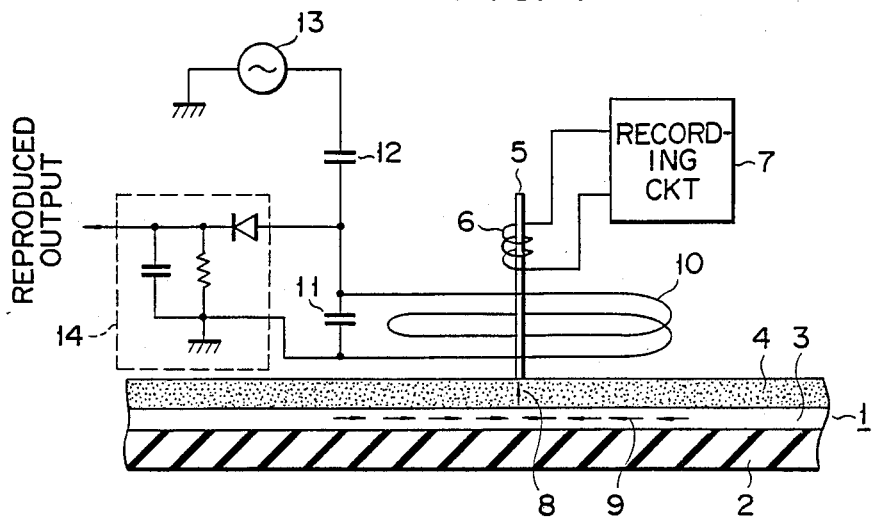
FIGS. 1 to 14 show embodiments of the magnetic recording/reproducing apparatus according to the present invention.

FIG. 1 shows a first embodiment of the present invention. A perpendicular magnetic recording medium 1 shown in a section along the direction of a track has a base layer 2, a high-permeability layer 3 formed on base layer 2, which is preferably formed of Fe-Ni alloy having a permeability of $\mu = 1,000$ or more; and a recording layer 4 formed on layer 3, which is formed of cobalt-chromium or barium-ferrite and has a perpendicular magnetic anisotropy.

A thin-film magnetic material 5 formed on a side of a supporting member (not shown) is disposed to have its one end faced recording layer 4 of recording medium 1. To record a signal, a recording coil 6 wound about magnetic material 5, which is a main pole of a perpendicular magnetic recording head, is supplied with a signal current from a recording circuit 7 to form a perpendicular signal magnetization 8.

On the other hand, the signal recorded in the form of perpendicular magnetization as described above is reproduced as described below according to the present invention. When magnetic material 5 is disposed on recording medium 1 in the same manner as in recording, a magnetic circuit is formed such that a magnetic flux generated by signal magnetization 8 in recording layer 4 directly under magnetic material 5 passes through magnetic material 5 and layer 3 and returns to signal magnetization 8. Thus, an enlarged magnetized region 9 is formed in layer 3 in the longitudinal direction of recording medium 1 in accordance with the signal magnetization 8 of a small area of recording layer 4. The magnetic variation, or the magnetic state in magnetized region 9, depends upon signal magnetization 8.

The magnetic variation in magnetized region 9 in high permeability layer 3 is detected by a detecting coil 10 which is arranged to be largely wound around magnetic material 5 as shown in FIG. 1 so as to be effectively coupled with the magnetic variation. The coil 10 forms a tuning circuit together with a tuning capacitor 11 which is connected in parallel with coil 10. A high frequency energy of 10 MHz or above is supplied from a high frequency oscillator 13 through a coupling capacitor 12 to the tuning circuit. In this case, detecting coil 10 produces a high frequency magnetic field perpendicularly to recording medium 1. Since the high frequency magnetic field is normal to the magnetization of magnetized region 9, the magnetized region 9 causes a ferromagnetic resonance.

Therefore, a tuning frequency and Q of the tuning circuit largely vary in accordance with the magnetized state of region 9 so that the resonance output voltage significantly alters. The variation in the signal magnetization 8, i.e., the reproduced output corresponding to the recorded signal can be obtained by detecting the variation in the resonance output voltage by a detecting circuit 14 connected to the tuning circuit.

FIGS. 2 to 14 show other embodiments of the present invention, wherein the same reference numerals are used to designate the same parts in the embodiment of FIG. 1. Only the difference therebetween will be described for the simplicity of description.

Figure 2:
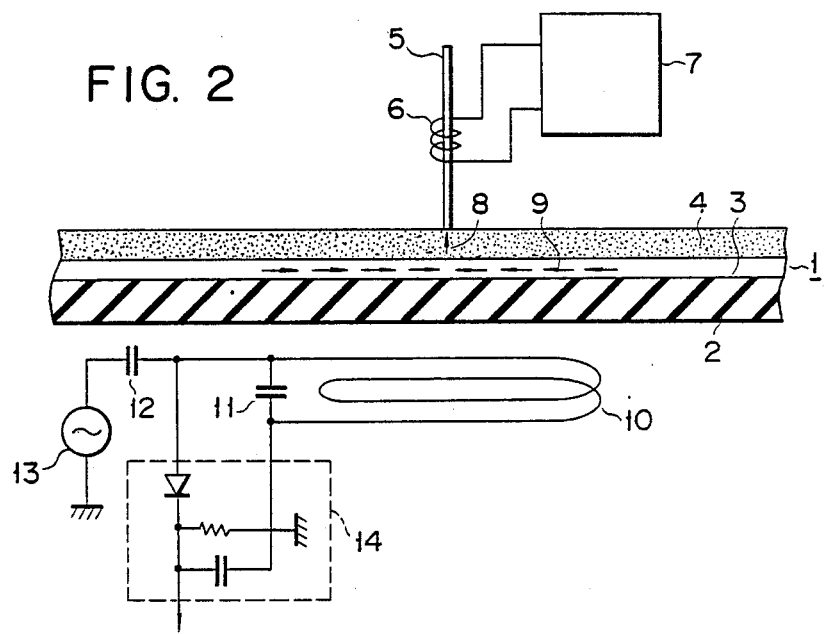

An embodiment of FIG. 2 is constructed in the same manner as the embodiment of FIG. 1 except that detecting coil 10 is provided on the base-layer side of recording medium 1. The detecting coil 10 is disposed to be opposed to the thin-film magnetic material 5 on recording layer 4.

Figure 3:
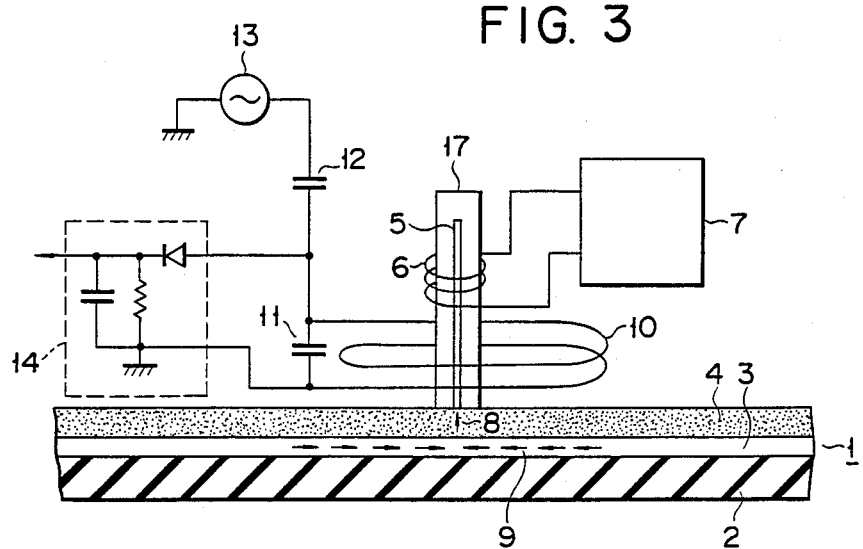

In an embodiment shown in FIG. 3, a non-magnetic conductor 17 is provided to surround magnetic material 5 except its one end facing recording layer 4 of recording medium 1. Thus, since the high frequency magnetic field generated in detecting coil 10 during reproduction does not act upon magnetic material 5, only the magnetic variation in high permeability layer 3 can be accurately detected, thereby permitting a reproduction with good S/N ratio.

Figure 4:
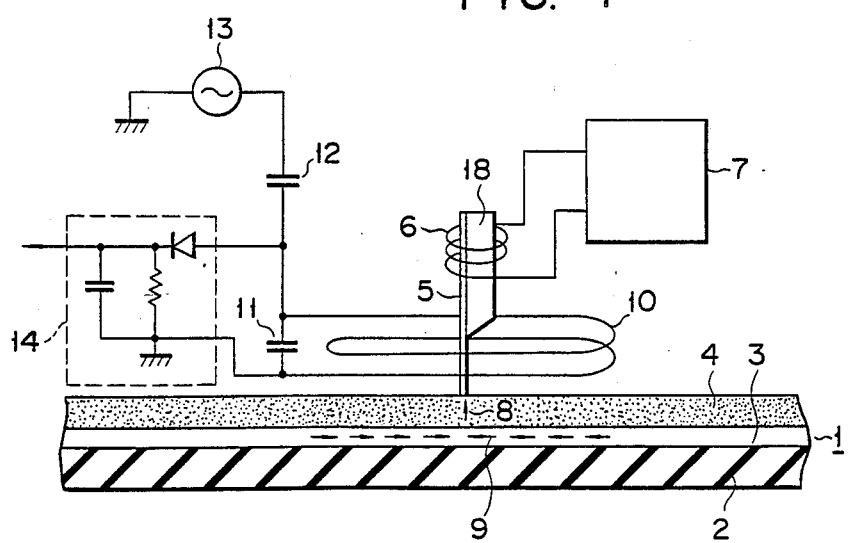

In an embodiment shown in FIG. 4 one side of thin-film magnetic material 5 is in intimate contact with magnetic plate 18. Thus, the magnetic resistance of the above-mentioned magnetic circuit reduces due to the presence of magnetic plate 18, thereby improving recording efficiency and reproducing sensitivity.

The embodiments shown in FIGS. 1 to 4 each have a combination of a perpendicular magnetic recording head using only one main pole (thin-film magnetic material 5) and a reproducing system according to the present invention. On the other hand, the following embodiments shown in FIGS. 5 to 8 uses a perpendicular magnetic recording head having a main pole (thin-film magnetic material 5) and a block-form auxiliary pole 19 of magnetic material which is opposite to the main pole with perpendicular magnetic recording medium 1 interposed therebetween.

Figure 5:
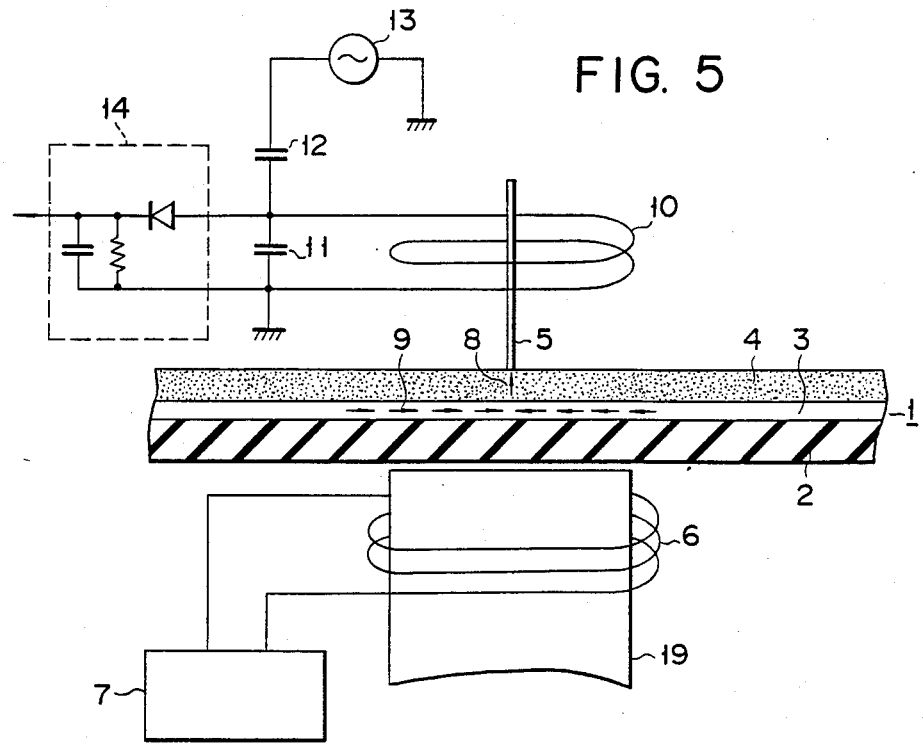
Figure 6:
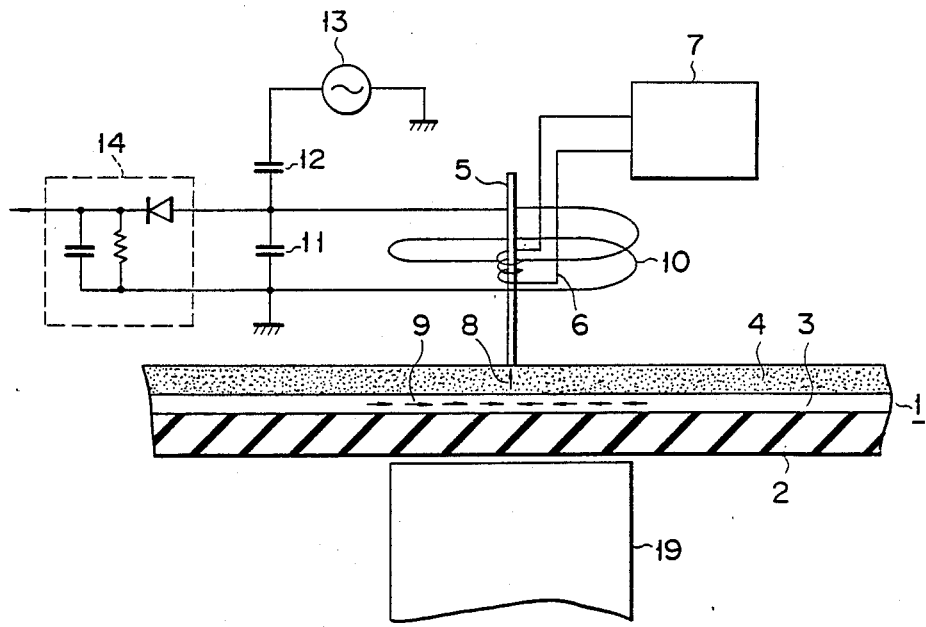
Figure 7:
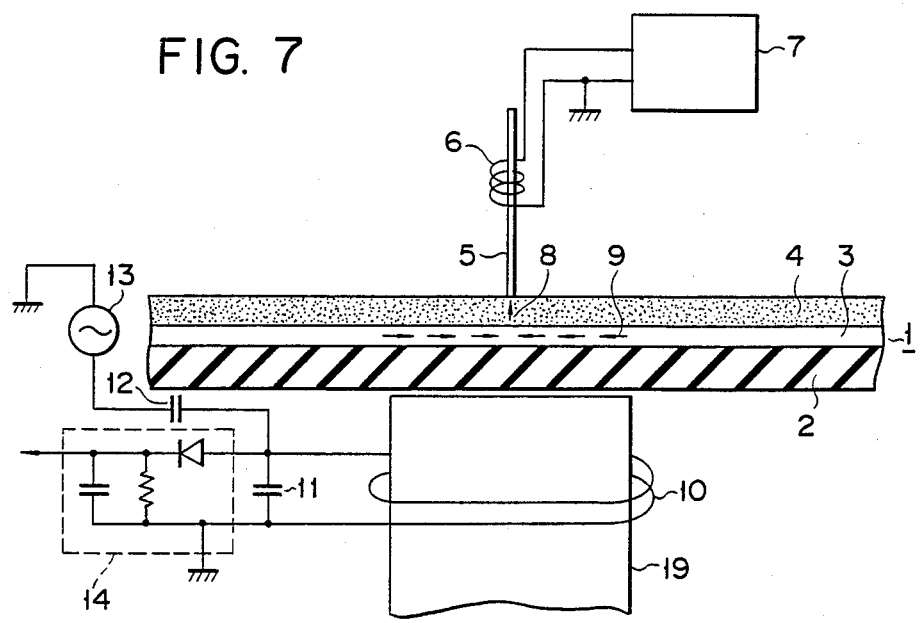
Figure 8:
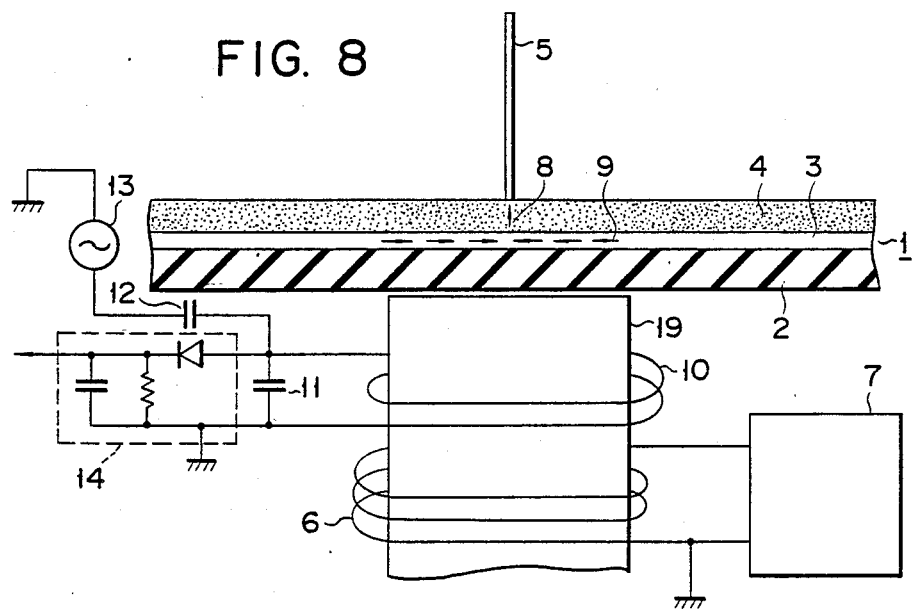

In the embodiment of FIG. 5, recording coil 6 is wound around auxiliary pole 19, which is of the so-called auxiliary-pole exciting type. In FIG. 6 recording coil 6 is wound around thin-film magnetic material 5 together with detecting coil 10. FIG. 7 shows an example in which recording coil 6 is wound around thin-film magnetic material 5, and detecting coil 10 is wound around auxiliary pole 19. In FIG. 8 recording coil 6 and detecting coil 10 are together wound around auxiliary pole 19.

According to the embodiments of FIGS. 5 to 8, the enlarged magnetized region 9 is formed in high-permeability layer 3 correspondingly to the area of auxiliary pole 19 facing recording medium 1 by signal magnetization 8 of recording layer 4. The magnetic variation in the magnetized region is detected by detecting coil 10 during reproduction, which is magnetically coupled to the magnetized region.

Figure 9:
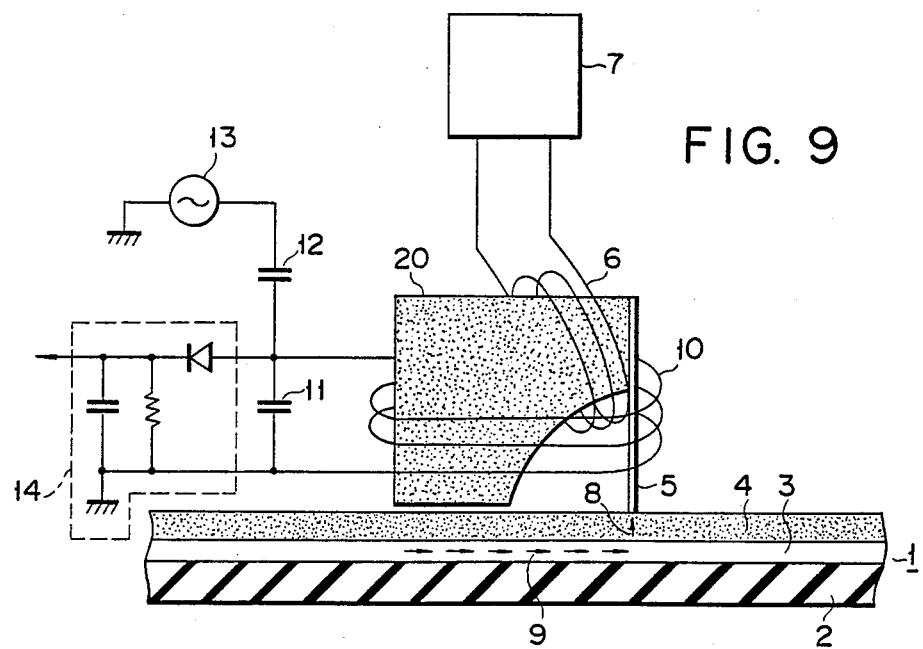
Figure 10:
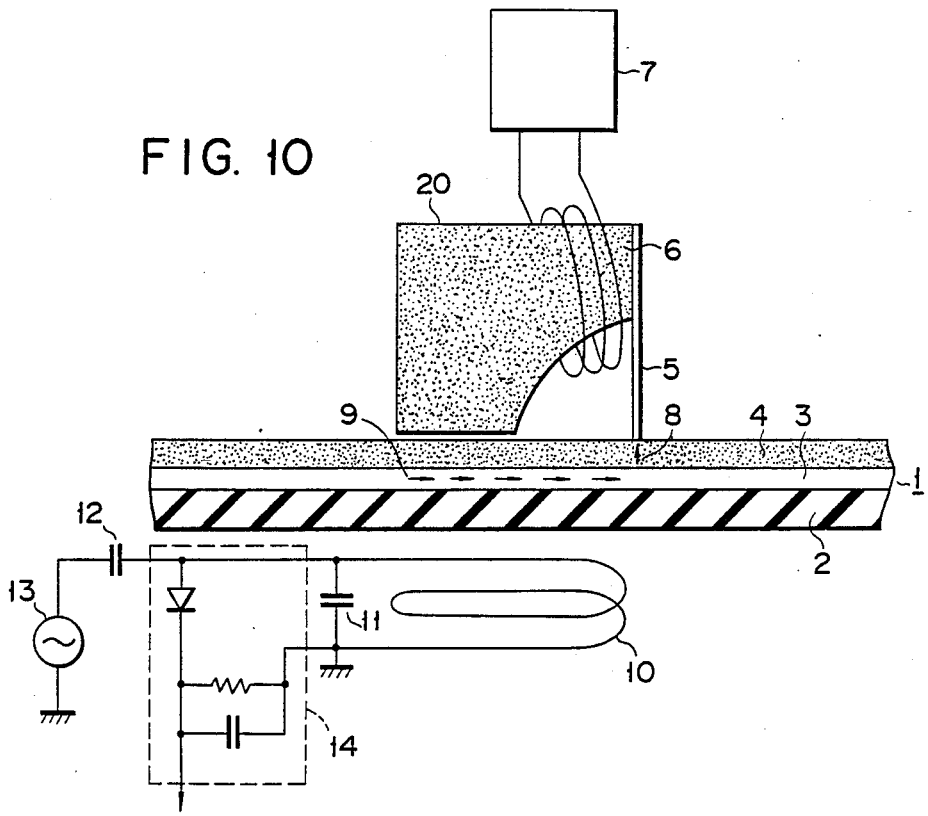
Figure 11:
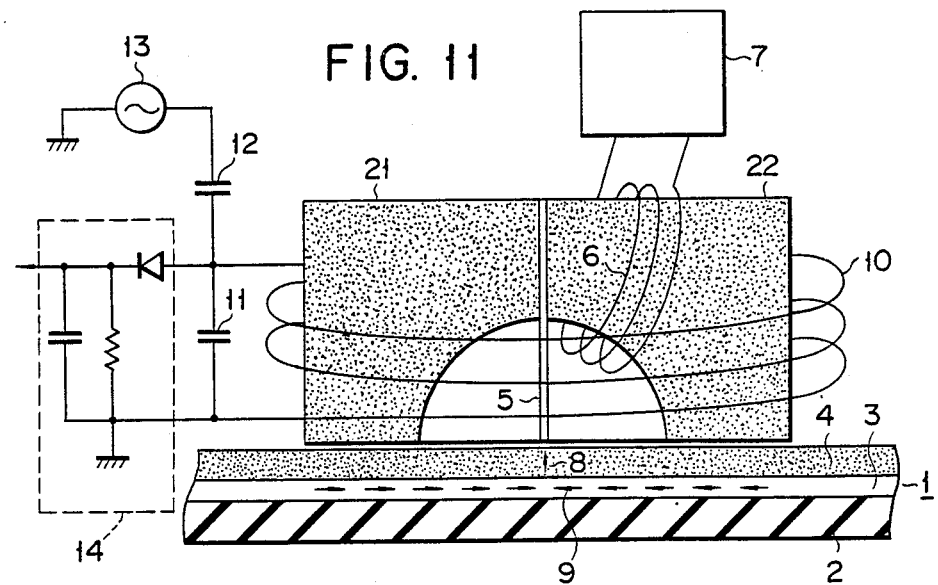
Figure 12:
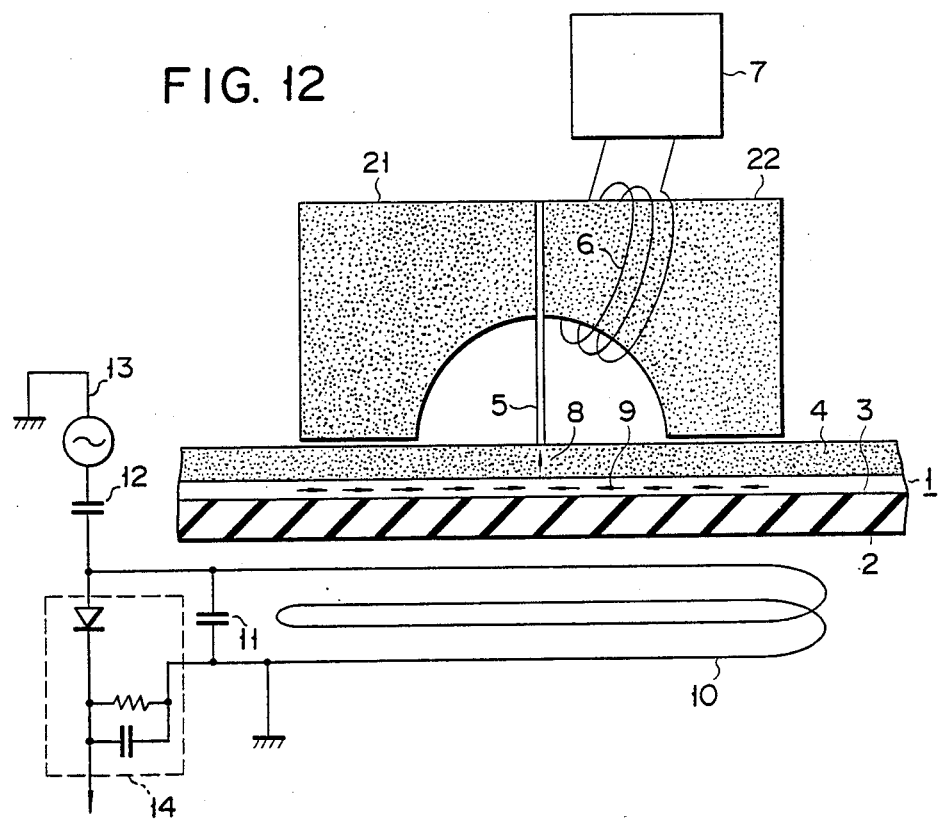

Next, the embodiments of FIGS. 9 to 12 are provided with a yoke 20, 21, 22 formed of magnetic material adjacent to thin-film magnetic material 5 to effectively form a magnetic path going from magnetization 8 through magnetic material 5 back to high permeability layer 3. In the embodiments of FIGS. 9 and 10, a single yoke 20 is employed. In FIG. 9, recording coil 6 is wound around yoke 20, and detecting coil 10 is wound around thin-film magnetic material 5 and yoke 20. In FIG. 10, recording coil 6 is wound around yoke 20, but detecting coil 10 is disposed on the base side of recording medium 1 to oppose yoke 20. With the embodiments of FIGS. 11 and 12 a yoke is divided into yokes 21 and 22 lengthwise of recording medium 1 with thin-film magnetic material 5 interposed therebetween.

According to the embodiments of FIGS. 9 to 12, the enlarged magnetized region is formed in high-permeability layer 3, which has a length corresponding to that of yoke 20, 21, 22.

In the embodiments so far described, detecting coil 10 is disposed so that the high frequency magnetic field produced therefrom is normal to the plane of the magnetic recording medium. With the embodiment of FIG. 1, for example, detecting coil 10 is disposed to surround magnetic material 5 to generate a perpendicular high frequency magnetic field. In order to detect the magnetic variation in the enlarged magnetized region formed in the high-permeability layer of the perpendicular magnetic recording medium, the detecting coil need not be limited to the above-mentioned arrangement.

Figure 13:
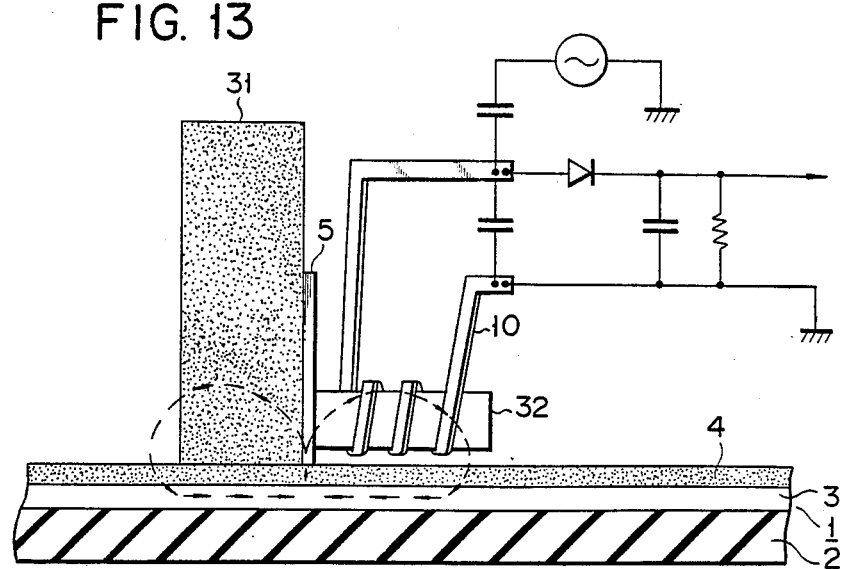
Figure 14:
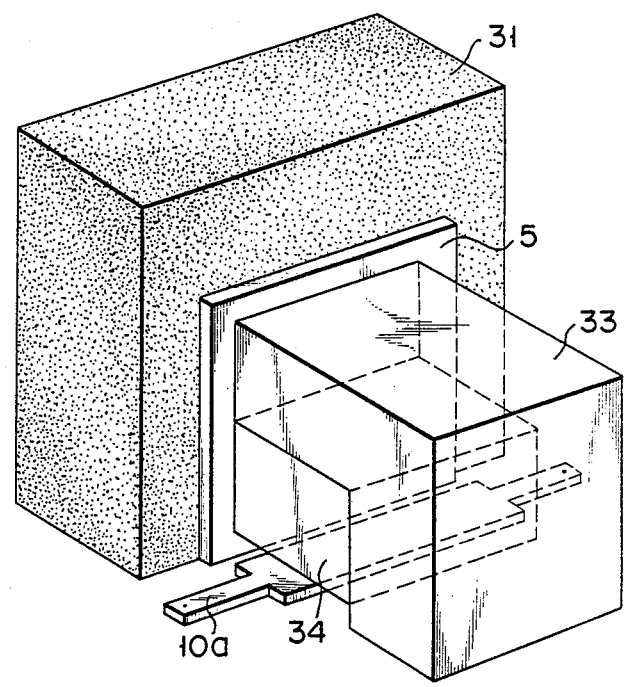

FIGS. 13 and 14 show still further embodiments of the present invention. In FIG. 13, thin-film magnetic material 5 is formed by sputtering on a nonmagnetic block 31 such as glass, nonmagnetic ferrite or dielectric material. A nonmagnetic coil support member 32 is adhered to thin film magnetic material 5, and detecting coil 10 is wound about support 32. Detecting coil 10 may be formed by vapor-deposition or sputtering. In the arrangement of detecting coil 10, the high frequency magnetic field is parallel to the plane of the recording medium, but a magnetic circuit is formed as designated by the broken lines. The detecting coil can detect the magnetic variation in the magnetized region as in the above embodiments. A d.c. bias magnetic field may be applied to the recording medium by suitable means in parallel with the recording medium and the travelling direction thereof.

In FIG. 14, a magnetic yoke 33 is adhered to thin film magnetic material 5, and a nonmagnetic block 34 such as glass is provided under yoke 33. A conductive thin film detector 10a is formed, by supttering, on the lower surface of block 34 in lateral direction of a recording medium. The magnetic variation in the magnetized area may be detected even by a flat detector without using a coiled detector as in the above-described embodiments.

What is claimed is:

1. For use with a perpendicular magnetic recording medium having a magnetic recording layer having an easy axis of magnetization in the direction normal tothe surface thereof, a high permeability layer backed on the rear surface of said recording layer, and a base layer supporting said recording layer and said high permeability layer, an apparatus for reproducing a signal recorded on said recording layer in the form of a perpendicular signal magnetization in the easy axis of magnetization comprising:

a thin film of magnetic material supported by a supporting member and disposed to extend in the direction normal to the recording layer with one end of said thin film of magnetic material facing said recording layer of said magnetic recording medium at a time of the signal reproduction, a magnetic variation occurring, due to the perpendicular signal magnetization in said recording layer when said one end of said thin film of magnetic material faces said recording layer, in the part of said high permeability layer that locates in the vicinity of said one end of said thin film of magnetic material;

a magnetically shielding member for magnetically shielding said thin film of magnetic material except said one end of thin film which is adapted for contacting said recording medium;

a detecting coil member disposed to surround said magnetically shielding member and said thin film of magnetic material and magnetically coupled to said high permeability layer of said recording member to detect the magnetic variation occuring in said high permeability layer at the time of the signal reproduction;

a capacitor coupled to said detecting coil member to form a resonance circuit;

a high frequency signal source coupled to said resonance circuit for supplying a high frequency electrical signal to said resonance circurt to provide a resonance output voltage; and reproducing circuit means coupled to said resonance circuit for reproducing the signal recorded on said recording medium in response to a variation in the resonance output voltage of said resonance circuit coupled to said high frequency signal source, the variation in the resonance output voltage of said resonance circuit resulting from detection of the magnetic variation occuring in said high permeability layer by said detecting coil member which is magnetically coupled to said high permeability layer.

2. The apparatus according to claim 1, wherein said detecting coil member is formed of a thin film of a conductor.

3. The apparatus according to claim 1, wherein said high permeability layer is formed of Fe-Ni alloy.

4. The apparatus according to claim 1, wherein said recording layer is formed of cobalt-chromium layer having perpendicular magnetic anisotropy.

5. The apparatus according to claim 1, wherein said recording layer is formed of barium-ferrite layer having perpendicular magnetic anisotropy.

6. The apparatus according to claim 1, wherein said shielding member is formed of a non-magnetic conductor.

* * * * *